United States Patent [19]

Keith et al.

[11] 4,173,008
[45] Oct. 30, 1979

[54] METHOD AND APPARATUS FOR PASSIVE DETECTION OF MARINE OBJECTS

[76] Inventors: Stanley R. Keith, 965 Harwood St., Imperial Beach, Calif. 92032; Ben J. Robinson, P.O. Box 4, Elton, Wis. 54430

[21] Appl. No.: 122,665

[22] Filed: Mar. 10, 1971

[51] Int. Cl.$^2$ ............................................. G01S 3/80
[52] U.S. Cl. ................................. 367/124; 343/112 D
[58] Field of Search ............... 340/2, 3 C, 5 R, 6 R, 340/16 R; 343/112 D

[56] References Cited

U.S. PATENT DOCUMENTS

| 2,206,036 | 7/1940 | Herson | 343/112 R |
| 3,430,243 | 2/1969 | Evans | 343/112 R |

OTHER PUBLICATIONS

Piggott, *J. Acous. Soc. Amer.*, vol. 36, No. 11, Nov. 1964, pp. 2152 & 2153.

*Primary Examiner*—Richard A. Farley
*Attorney, Agent, or Firm*—Wheeler, Morsell, House & Fuller

[57] ABSTRACT

A method and apparatus for passively detecting, locating and tracking submerged or waterborn objects which generate acoustic radiation as they move through the water, includes a hydrophone array which is linked to a monitoring station by cable or radio transmitters. The apparatus at the monitoring station includes a hydrophone selector for individually monitoring the output of each hydrophone, a band pass filter, a db meter and visual display apparatus. The db meter is provided with indicia to convert the difference in intensity in db for the hydrophones to a range or distance ratio from the hydrophones to the noise source. A fix on the noise source can be obtained by plotting range ratio circles or using a tactical display scope. Once the noise source is located, the db meter is calibrated to read directly the range from the hydrophones to the object.

14 Claims, 11 Drawing Figures

METHOD AND APPARATUS FOR PASSIVE DETECTION OF MARINE OBJECTS

BACKGROUND OF INVENTION

Prior art active detection of targets with echo ranging sonar is effective for locating and tracking targets but the target being hunted can detect the signals transmitted by the sonar transducer of the hunting vessel. Accordingly, the personnel on the hunted ship will be aware that they are being tracked.

Heretofore, passive methods of determining a target position or the location of a noise source required the use of expensive and bulky directional hydrophones located at widely separated positions. If it was possible to determine that each hydrophone was receiving noise from the same source, bearing lines were plotted from each hydrophone position to obtain a fix. Since the bearing resolution of directional hydrophones is poor, the fixes obtained involved substantial errors. Furthermore, the target had to provide noise of high intensity to provide an identifiable and usable signal.

SUMMARY OF INVENTION

The invention provides a method and apparatus for passively detecting, locating and tracking noise generating objects. The invention provides a more accurate fix than directional hydrophones.

Ships, boats and sea life which move through the water generate random noise or acoustic radiation which encompasses a wide frequency band rather than a tone or single frequency. The method of the invention contemplates measuring and comparing the intensity of the noise in a selected frequency band at various locations by an array of hydrophones which are linked to a monitoring station by cables or radio transmitters.

The monitoring station includes a selector for listening to each hydrophone individually and a band-pass filter which includes a plurality of frequency bands. The output of the band-pass filter is coupled to a noise analyzer which includes an audio amplifier and a db meter. The amplifier has one output connected to or coupled to headphones and another output connected to a target presence indicator. The amplifier and db meter can also be coupled to a tactical, cathode-ray display scope or a computer controlled, display scope. The db meter is provided with a db scale and a range ratio scale which is equated to the db scale by the equation $db = 5 \log R$, where R is the range or distance between the hydrophone and the noise source.

We have determined by experiments that the transmission loss in db of a frequency band of noise produced by objects moving through the water is equal to $5 \log R$, where R is the range or distance between the sound receiver and the noise source. Thus, by measuring the intensity of sound as sensed by the sound receivers and measured by the db meter for each of the sound receivers individually, the ratio of the ranges or distances between any two hydrophones and the target can be read directly from the meter. The location of the target can then be determined by plotting ratio circles.

when three hydrophones are employed, two ratio circles are plotted to obtain an intersection of the circles which is the fix on the target. Once the target location has been determined by plotting, the db meter is calibrated for direct reading of the range from any hydrophone to the target in miles or any other unit. When the meter is calibrated, the target can be tracked by reading directly on the meter the range from each hydrophone to the noise source and plotting range circles with each hydrophone as the center of the range circle to obtain an intersection of arcs, and thus, a fix.

Further objects and advantages of the present invention will become apparent from the following disclosure.

DRAWINGS

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structures.

Figure 1:
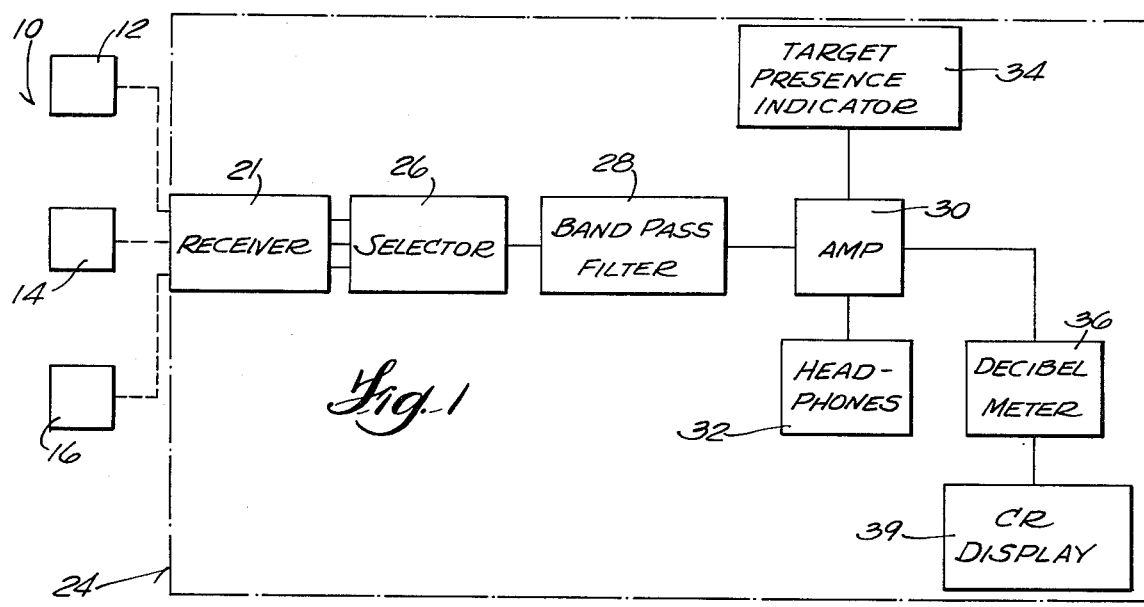
FIG. 1 is a schematic diagram of apparatus adapted to practice the method of the invention.
Figure 7:
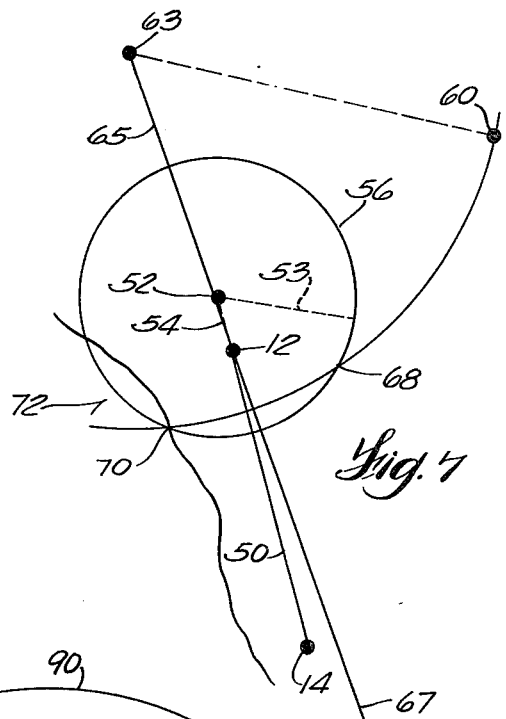
FIG. 7 is a schematic diagram of a hydrophone array and a range ratio circle plot showing a fix on a hypothetical noise source.

The illustrated apparatus employed to practice the method of the invention includes a hydrophone array 10 (FIG. 1) containing three or more sound receivers or non-directional hydrophones 12, 14 and 16 which can be arranged in the off-shore configuration shown in FIG. 7 with the hydrophones spaced at selected distances. The hydrophones are connected to the monitoring station 24 by a transmission link in the form of a cable or individual transmitters contained in each hydrophone. The link or transmitters transmit the output signals from the hydrophones to a monitoring station 24 which has a receiver 21 for receiving the signals transmitted by the hydrophones.

The monitoring station 24 includes a hydrophone selector switch 26 for selectively listening and measuring the output of the individual hydrophones. The hydrophone selector 26 is coupled to a band-pass filter 28 which is provided with a band selector switch for passing selected frequency bands such as 2,400 to 4,800 Hertz. The band-pass filter 28 is coupled to an audio amplifier 30 which has one output connected to head phones 32 and another output connected to a target presence indicator 34. The target presence indicator 34 desirably comprises an audio controlled relay circuit with a signal light which indicates an increase in signal strength above a pre-selected level or detection threshold as hereinafter described.

The amplifier 30 also has an output coupled to a signal strength meter such as a decibel meter 36 which is desirably coupled with a cathode ray tactical display scope or other visual display apparatus 39.

Figure 6:
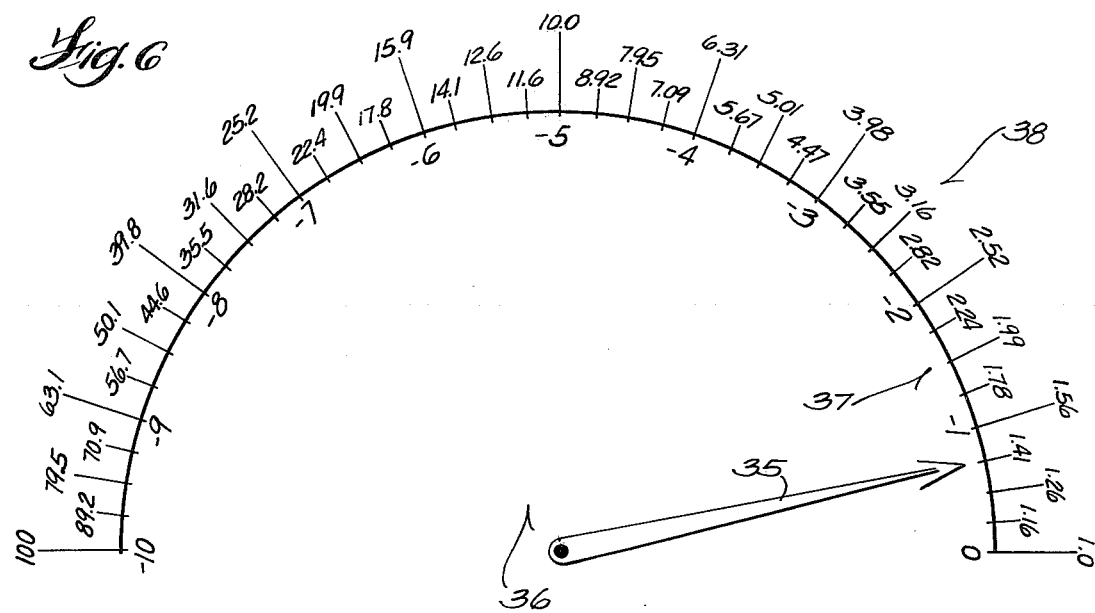
FIG. 6 is a diagrammatic view of a scale employed on the decibel meter schematically shown in FIG. 1.

As shown in FIG. 6, the meter 36 is provided with a db scale 37 and a range ratio scale 38. The range ratio scale 38 is equated to the db scale 37 by the equation:

TL (transmission loss in db)=5 Log R, where R is the range or distance in miles or other unit from the noise source to the sound receiver. It is known that the transmission loss for spherical spreading in water of a discrete frequency or tone generated by a sound source is equal to 20 Log R. Our experiments and tests have shown that the equation TL=5 Log R is a workable and more accurate representation of the transmission loss in water of a frequency band of noise as distinguished from a single discrete tone.

When using the apparatus to practice the method of the invention, individual readings may be taken for each of two hydrophones and the amplifier gain is adjusted so that the db reading of the loudest hydrophone has a reading on db scale 37 of "0". The reading for the weaker signal will be a negative db value on scale 37. Scale 38 is calibrated to indicate at the position of the needle 35 a range ratio number which gives an instant reading of the ratio of the distance of the object from the weak signal hydrophone to the distance of the object from the strong signal or reference hydrophone.

For example, if the db reading of the weaker signal from the hydrophone furthest from the noise source is −2 db, the range ratio reading on scale 38 aligned with the db reading on scale 37 is 2.52 or a range ratio of 2.52:1. Thus, if the distance from the noise source to the strong signal hydrophone is 10 miles, the distance from the noise source to the weak signal hydrophone will be 10×2.52, or 25.2 miles.

In addition to and in lieu of using the range ratio scale 38, the range ratio of 2.52:1 can also be determined using the equation TL (transmission loss in db)=5 Log R, or Log R=(TL/5). Thus, where the difference in transmission loss in db between the strong and weak signal is 2 db, the Log R=(2/5) or 0.4. Reference to standard log (base ten) tables discloses that R (range) equals 2.52.

The range ratio as thus determined is used with a range ratio between the loudest signal and a weaker signal from a third hydrophone to plot and obtain a fix on the target, as presently described, so that the distance from any one hydrophone to the target or noise source can be measured on a chart. Once the distance from the loudest hydrophone to the noise source is measured on the chart, the meter 36 can be calibrated by adjusting the amplifier gain to read range directly from each hydrophone to the noise source as subsequently described in detail.

In practising the method of the invention, the band-pass filter is employed to search for bands of noises having amplitudes greater than the ambient noise level caused by wind, waves, storms, distant ship traffic, etc.

Figure 2:
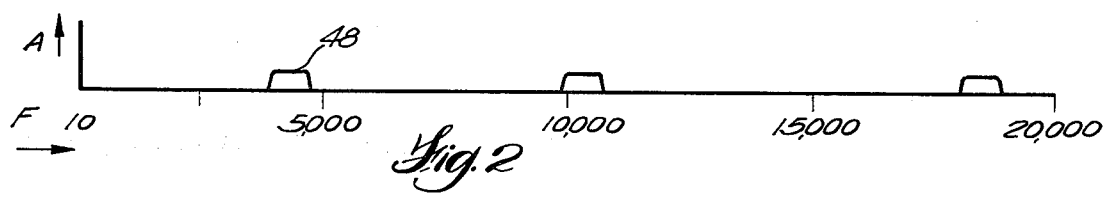
FIG. 2 is a chart showing frequency and amplitude of frequency bands of acoustic radiation generated by three different noise sources.

FIG. 2 shows a plot of frequency and amplitude for three noise sources which create bands of noise approximately 300 to 500 Hertz wide.

Figure 3:
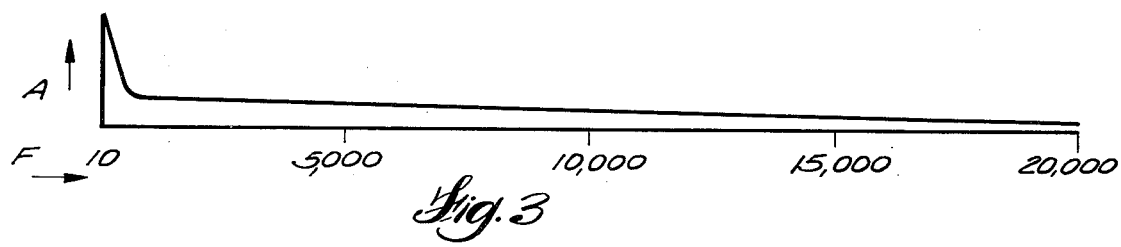
FIG. 3 is a chart showing the amplitude and frequency of ambient or background noise in sea water.
Figure 4:
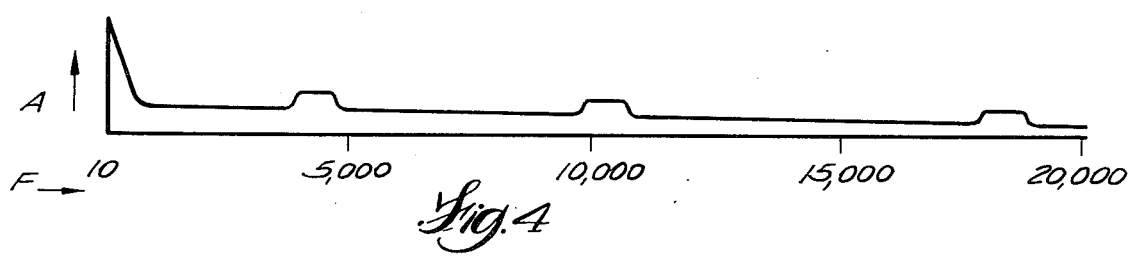
FIG. 4 is a chart showing the amplitude and frequency of the noise bands of FIG. 2 superimposed on the background noise shown in FIG. 3.

FIG. 3 is a frequency and amplitude curve of the ambient noise and FIG. 4 shows the three noise sources superimposed on the ambient noise. The frequency band of noises generated by moving objects in sea water is approximately 300 to 500 Hertz wide, and thus, a noise source or possible target can be readily identified by plotting curves.

When searching for a noise source or possible target, the band-pass filter is set to pass a frequency band such as 2,400 to 4,800 Hertz and the band-pass filter is swept through the frequency band and a curve of frequency and amplitude is plotted. If only ambient or background noise is present in that frequency band, the amplitude vs. frequency curve will appear as shown in FIG. 3 for each of the hydrophones. With only ambient noise present, the bias in the control circuit for the target presence indicator 34 can then be adjusted so that the signal light or other warning indicator is off when only ambient noise is being received by the hydrophones. When a signal is received with an amplitude above that of the ambient noise, the relay in the target presence indicator 34 will trip and the signal light will be illuminated. Thus, the target presence indicator provides a detection threshold, and continuous monitoring of the head phones 32 is not required to ascertain the presence of a target within the range of the hydrophones.

Figure 5:
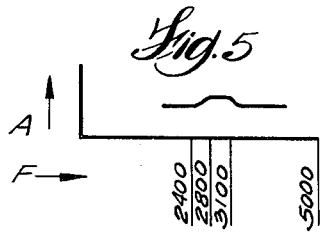
FIG. 5 is a chart showing an amplitude and frequency curve of noise received by a single hydrophone and generated by a hypothetical target.
Figure 5A:
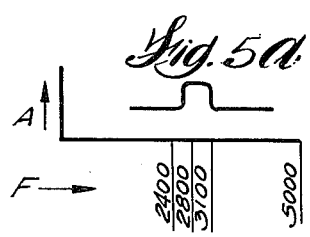
FIG. 5A is a chart similar to FIG. 5 of the noise curve of a second hydrophone.

When a possible target has been detected, the hydrophone selector 26 is switched through all the hydrophone channels and the db meter readings for each of the hydrophones are recorded as the band-pass filter is swept through the selected frequency band. A curve of frequency verses amplitude can be plotted for each of the hydrophones. FIG. 5 shows a curve for a hypothetical noise source for one hydrophone and FIG. 5A is a curve for the same noise source prepared by measuring the output of a second hydrophone. The higher amplitude of the curve in 5A indicates that the noise source is closer to the second hydrophone. The envelope of frequencies for each hydrophone spans the same frequency band although the amplitude varies, thus indicating that each of the two hydrophones is receiving noise from the same source. The head phones 32 can also be used to make an aural comparison of the noise to determine whether each hydrophone is receiving noise from the same target.

If a noise source or target is detected, using frequency vs. amplitude curves and the headphones, db meter readings are taken for each of the hydrophones and the hydrophone with the strongest reading is selected as a reference. The gain on the amplifier is adjusted so that the db meter needle 35 is set at "0" db on the meter scale shown in FIG. 6. Thus, if hydrophone 12 has the strongest signal and is used as the reference hydrophone, hydrophones 14 and 16 will read negative db on the meter scale.

If, for instance, hydrophone 14 gives a reading of −2 db, the range ratio between hydrophones 12 and 14 of 1:2.52 is read on the scale 38. A ratio circle 56 is next plotted (FIG. 7) so that the distances of any point on the ratio circle 56 to hydrophone 12 and hydrophone 14 have a ratio of 1 to 2.52. FIG. 7 shows hydrophones 12, 14 and 16 arranged along a shore line 72 and separated by measured distances. The line 50 between the reference hydrophone 12 and hydrophone 14 is designated the baseline. A prerequisite to plotting the ratio circle 56 is to determine the radius 53 of the ratio circle 56 and the location of the center 52 of the circle 56 using hydrophones 12 and 14 as offset focal points. The radius of the ratio circle 56 and the center 52 of the ratio circle 56 are determined by an offset plotting technique using the following equations where minimum distance is the minimum distance the target can be from the strongest or reference hydrophone 12 and maximum distance is the maximum distance the target can be from the reference hydrophone:

$$\text{Minimum (distance)} = \frac{\text{Baseline}}{\text{Ratio} + 1.0}$$

$$\text{Maximum (distance)} = \frac{\text{Baseline}}{\text{Ratio} - 1.0}$$

Radius (of ratio circle) =
$$\frac{\text{Maximum (distance)} + \text{Minimum (distance)}}{2}$$

Extension (baseline) = Radius − Minimum (distance)

Thus, if the distance between the hydrophones 12 and 14 on base line 50 is 20 miles, we obtain the following values for the base line extension 54 and the radius 53 for a ratio reading of 2.52:

$$\text{Minimum (distance)} = \frac{20}{3.52} = 5.7 \text{ miles}$$

$$\text{Maximum (distance)} = \frac{20}{1.52} = 13.2 \text{ miles}$$

$$\text{Radius (of ratio circle 56)} = \frac{13.2 + 5.7}{2} = 9.5 \text{ miles}$$

Extension (of base line 50) = 9.5 − 5.7 = 3.8 miles

The base line 50 is then extended 3.8 miles with an extension line 54 to locate the center 52 of the ratio circle 56 which is at the end of the extension line 54. The ratio circle 56 having a radius 53 of 9.5 miles is thence drawn about the center 52.

After plotting the first ratio circle 56, a second ratio circle 60 is plotted to obtain an intersection of arcs 68 which is the fix on the target. The foregoing steps and equations are employed using hydrophones 12 and 16 as the focal points. The center 63 of circle 60 is located at the end of the extension line 65 of the baseline 67 between hydrophones 12 and 16. The ratio circles 56 and 60 intersect at two points, 68 and 70. Since the intersection 70 is on shore 72, the intersection 68 is the probable fix on the noise source or target.

In practice, it is not necessary to calculate the base line extensions and radii of the ratio circles. Charts have been prepared using computers to provide the data for the base line extensions and radii of the ratio circles. If a computer controlled scope is employed, the computer is programmed with the base line extensions and radii for various db readings.

To calibrate the db meter 36 to read the range directly from the hydrophones to the fix or target, the distance from the reference hydrophone 12 to the fix 68 is scaled on the plot in FIG. 7. If, for instance, the scaled distance is 14 miles, the gain on the amplifier 30 is adjusted to position the needle 35 to give a reading of 14 on the db meter range ratio scale 38, which would correspond to 5.75 on the db scale. The db meter 36 is thus calibrated in range units whether or not the measured distance is in nautical miles or yards, etc. If the hydrophone selector 26 is now switched to the channel for hydrophone 14, the db meter will read directly in the selected units the distance from hydrophone 14 to the fix 68.

Figure 8:
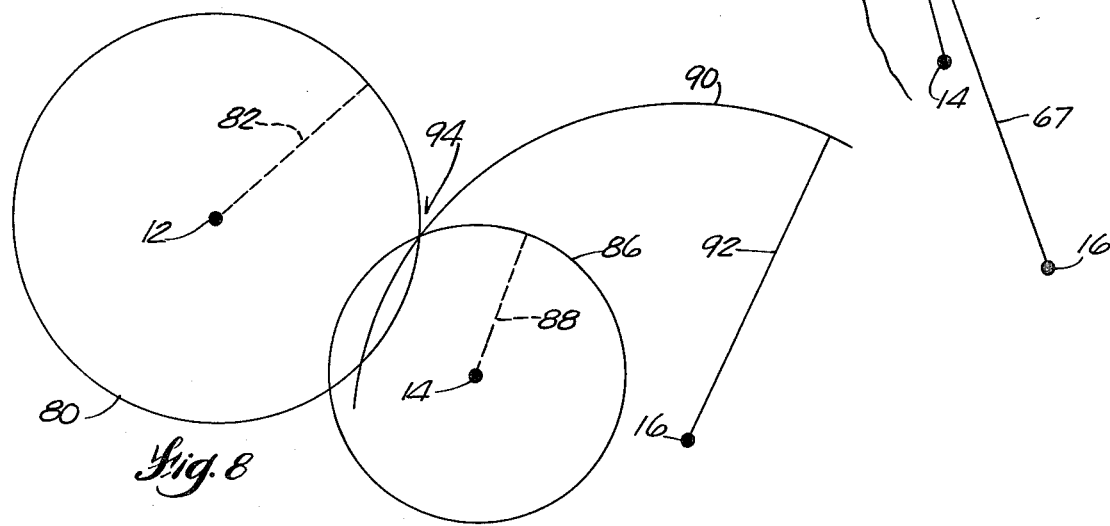
FIG. 8 is a view similar to FIG. 7 including a plot of intersecting range circles.

Once the meter 36 is calibrated to read range directly as above described, the target can be tracked and its position located by plotting range circles. FIG. 8 is a plot of hydrophones 12, 14 and 16 with the range circles for each of the hydrophones. The channel selector is successively switched to obtain a meter reading with the calibrated meter for each of the hydrophones 12, 14 and 16. If the range reading for hydrophone 12 is 14 miles, the target position is at some point on a circle 80 in which the center of the circle is the position of the hydrophone 12 and the radius is 14 miles. If the meter reading for hydrophone 14 is 10 miles, a circle 86 with a radius 88 of 10 miles is drawn around hydrophone 14. If the meter reading for hydrophone 16 is 22 miles, a circle 90 with a radius 92 of 22 miles is drawn around the hydrophone 16. The common intersection 94 of the circles 80, 86 and 90 thus provides a fix on the target at its new position. Additional meter readings at timed intervals with plots of the changed target position, provides data on course and speed of the target.

In addition to mechanically plotting the ratio circles, the output of the amplifier 30 can be coupled to a visual display apparatus 39, such as the U.S. Navy's NA/A-SA-16 tactical display scope, which is capable of displaying two ratio circles simultaneously and up to 12 fixes continuously. A computer controlled display can also be programmed to sample the db readings of the various hydrophones to compare them to the true baseline distance and plot the fix on the display.

Figure 9:
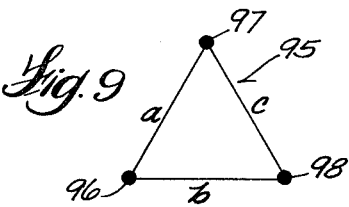
FIG. 9 is a schematic plan view of a hydrophone array with three hydrophones.

FIG. 9 shows a hydrophone array 95 which includes hydrophones 96, 97 and 98 which are located at the vertices of an equilateral triangle. The sides or base lines a, b or c of the triangle are desirably between 10 and 30 miles. Base lines of 25 miles were successfully used to locate and track a school of porpoises.

Figure 10:
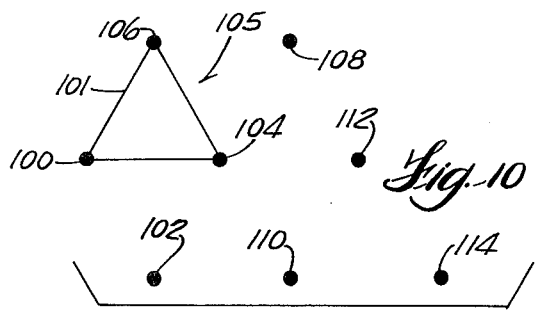
FIG. 10 is a schematic plan view of a hydrophone array with multiple groups of three hydrophones.

FIG. 10 shows a hydrophone array 105 formed by a pattern of equilateral triangles having hydrophones located at common vertices of the triangles. Ideally, the target is within the triangle formed by the hydrophones which are being monitored. When the target moves out of range of group 101 of hydrophones 100, 104, and 106, and into the range of group 105, hydrophones 104, 108 and 112 are monitored to obtain range readings on the meter 36.

We claim:

1. Apparatus for locating and tracking a marine noise source, comprising an array of underwater sound receivers spaced at preselected distances, means for transmitting the output of said sound receivers to a monitoring station; switch means for selectively and individually monitoring the output of any of the sound receivers, a band-pass filter coupled to said switch means and having a plurality of frequency bands, and means coupled to said band-pass filter to measure the output signals of the individual sound receivers in said array in units usable for determining the distance range from the sound receivers to the noise source and wherein said means for measuring the output signals of said sound receivers comprises an amplifier having an output coupled to said band-pass filter and a meter coupled to the amplifier output, said meter including a meter scale with db indicia and range ratio indicia equated to the db indicia by an equation which relates transmission loss of sound in water to the range of the sound source.

2. Apparatus in accordance with claim 1 wherein said range ratio indicia is equated to said db indicia by the equation:

$$\text{transmission loss in db} = 5 \log R,$$

where R is the distance range between the receiver and the noise source.

3. Apparatus in accordance with claim 1 wherein said amplifier has an output connected to a cathode ray display scope.

4. Apparatus for passively determining the position of a noise generating marine object comprising an array of spaced underwater sound receivers, means for transmitting the output of said receivers to a monitoring station, switch means for selectively monitoring each of said sound receivers, a band-pass filter coupled to said switch means, visual display means, and means coupled to said filter means to sample the output signals of each of said sound receivers, and plot continuous fixes of the noise generating object on said visual display means including target presence indicating means coupled to said amplifier to provide an indication of a signal having an amplitude greater than the amplitude of the ambient noise.

5. Apparatus for passively determining the position of a noise generating marine object comprising an array of spaced underwater sound receivers, means for transmitting the output of said receivers to a monitoring station, switch means for selectively monitoring each of said sound receivers, a band-pass filter coupled to said switch means, visual display means, and means coupled to said filter means to sample the output signals of each of said sound receivers, and plot continuous fixes of the noise generating object on said visual display means and wherein said array of sound receivers comprises three receivers located at the vertices of an equilateral triangle.

6. Apparatus in accordance with claim 5 wherein said array of sound receivers includes a pattern of multiple equilateral triangles with sound receivers located at common vertices of the triangles.

7. A method of determining the location of a noise generating marine object comprising the steps of measuring the intensity of the frequency band of noises produced by the noise source at plural locations using underwater sound receivers spaced at known distances, comparing the intensities of the sound received at each of the receivers and selecting the receiver with the strongest signal as the reference receiver, determining the ratio of distances to the noise source between the reference receiver and sound receiver receiving a weaker signal using an equation which relates transmission loss to distance range of the noise source from the receiver, plotting a range ratio circle using the location of the reference receiver and the weaker receiver as the focal points, calculating the ratio of ranges between a second receiver having a weak signal and the reference receiver using an equation which relates transmission loss to range of the noise source from the other of the receivers, plotting a ratio circle by using the locations of the reference receiver and the other of the weaker receivers as focal points to obtain an intersection of arcs of two range ratio circles to fix the location of the noise generating object.

8. A method in accordance with claim 7 plus the step of measuring the distance from the reference sound receiver to the fix on the noise generating object to determine the distance range from the reference receiver to the object.

9. A method in accordance with claim 8 including the further step of using the distance range from the reference receiver as a reference range for determining the range of other sound receivers to the location of the noise generating object.

10. A method of locating and tracking a marine noise source using a hydrophone array, comprising the steps of sequentially listening to the output of each of the hydrophones, measuring the intensity of the output of each of the hydrophones for a selected frequency band with a signal strength meter, and calibrating the meter in range ratio indicia equated to db indicia by the equation:

transmission loss in db = 5 Log R.

11. The method of claim 10 including the step of using the calibrated meter to read distance range directly from any of the hydrophones to the noise source.

12. A method of locating and tracking a marine noise source using a hydrophone array, comprising the steps of sequentially listening to the output of each of the hydrophones, measuring the intensity of the output of each of the hydrophones for a selected frequency band with a signal strength meter, and calibrating the meter in distance range units and wherein the step of measuring the intensity of the output of each of the hydrophones is followed by the step of plotting frequency vs. amplitude curves of the measured output signals of each hydrophone and comparing the curves to determine that the signals from each hydrophone have a common source.

13. A method of locating and tracking marine noise sources using an array of three sound receivers spaced at predetermined distances and a transmission link to relay the sound receiver outputs to a monitoring station which includes a band-pass filter, an amplifier and a signal strength meter coupled in sequence and the meter having db indicia and range ratio indicia, comprising the steps of measuring and comparing the output signals of each of two sound receivers with the meter to obtain a distance range ratio between the two receivers, measuring the output signal of the other of the sound receivers to obtain a range ratio with one of the two sound receivers and calibrating the meter using the range ratio data to read range directly from any one of the sound receivers to the noise source.

14. A method in accordance with claim 13 wherein said sound receivers are located at the vertices of an equilateral triangle.

* * * * *